United States Patent
Carney et al.

(10) Patent No.: US 9,160,467 B2
(45) Date of Patent: Oct. 13, 2015

(54) METHOD AND SYSTEM FOR ASSIGNING DEFINITIONS TO MEDIA NETWORK CHANNELS

(75) Inventors: Mark D. Carney, Sterling, VA (US); Dante J. Pacella, Charles Town, WV (US); Jeffrey A. Jackson, Coppell, TX (US); Martin William Mckee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/327,198

(22) Filed: Dec. 15, 2011

(65) Prior Publication Data

US 2013/0160062 A1    Jun. 20, 2013

(51) Int. Cl.
| | | |
|---|---|---|
| H04N 7/173 | (2011.01) | |
| H04H 20/42 | (2008.01) | |
| H04N 21/2343 | (2011.01) | |
| H04N 21/2362 | (2011.01) | |
| H04N 21/2385 | (2011.01) | |
| H04N 21/258 | (2011.01) | |
| H04N 21/442 | (2011.01) | |
| H04H 60/31 | (2008.01) | |

(52) U.S. Cl.
CPC ......... *H04H 20/423* (2013.01); *H04N 21/2362* (2013.01); *H04N 21/2385* (2013.01); *H04N 21/23439* (2013.01); *H04N 21/25866* (2013.01); *H04N 21/44222* (2013.01); *H04H 60/31* (2013.01)

(58) Field of Classification Search
CPC ................ H04N 21/23439; H04N 21/2402
USPC .......................... 348/387.1; 725/95; 375/240
See application file for complete search history.

(56) References Cited

U.S. PATENT DOCUMENTS

| | | | |
|---|---|---|---|
| 6,701,528 B1 * | 3/2004 | Arsenault et al. | 725/89 |
| 8,175,020 B2 * | 5/2012 | Beaudoin et al. | 370/312 |
| 2005/0169314 A1 * | 8/2005 | Beaudoin et al. | 370/480 |
| 2008/0055462 A1 * | 3/2008 | Garg et al. | 348/387.1 |
| 2008/0101460 A1 * | 5/2008 | Rodriguez | 375/240.01 |
| 2010/0054712 A1 * | 3/2010 | Wollmershauser et al. | 386/123 |
| 2010/0146107 A1 * | 6/2010 | Fiatal | 709/224 |
| 2010/0306810 A1 * | 12/2010 | Brooks et al. | 725/109 |
| 2011/0072474 A1 * | 3/2011 | Springer et al. | 725/95 |
| 2011/0102683 A1 * | 5/2011 | Josephs | 348/731 |
| 2012/0180080 A1 * | 7/2012 | Lajoie | 725/14 |
| 2012/0272285 A1 * | 10/2012 | Brooks et al. | 725/146 |

* cited by examiner

*Primary Examiner* — Hunter B Lonsberry
*Assistant Examiner* — Tariq Xola Nziyo Gbond

(57) ABSTRACT

An approach for assigning definitions to media network channels is described. A demand for program content of a media network channel associated with a first definition relating to resolution of the program content is determined. A second definition is assigned to the media network channel for the program content in response to the demand, wherein the second definition relates to the resolution of the program content and is higher in resolution than the first definition.

18 Claims, 9 Drawing Sheets

| QAM Channel 65 | | | | | QAM Channel 66 | | |
|---|---|---|---|---|---|---|---|
| Video 471 MHz | | | | Audio 473.75 MHz | Video 477 MHz | Audio 489.75 MHz | |
| Media Network Channel X1 | Media Network Channel X2 | Media Network Channel X3 | Media Network Channel X4 | Dynamic Controls | Media Network Channel X5 in HD | Media Network Channel X6 in HD | |

700

| User Channels | Media Network Channel | QAM |
|---|---|---|
| 1 | X1 | 65-1SD |
| 2 | X2 | 65-2SD |
| 3 | X3 | 65-3SD |
| 4 | X4 | 65-4SD |
| 5 | X5 | 66-1HD |
| 6 | X6 | 66-2HD |

730

| User Channels | Media Network Channel | QAM |
|---|---|---|
| 1 | X1 | 66-2HD |
| 2 | X2 | 66-1HD |
| 3 | X3 | 65-3SD |
| 4 | X4 | 65-4SD |
| 5 | X5 | 65-2SD |
| 6 | X6 | 65-1SD |

750

METHOD AND SYSTEM FOR ASSIGNING DEFINITIONS TO MEDIA NETWORK CHANNELS

BACKGROUND INFORMATION

Service providers are continually challenged to deliver value and convenience to consumers by providing compelling network services and advancing the underlying technologies. One area of interest has been the development of services and technologies relating to presentation of media content. For example, in recent years, high-definition (HD) devices (e.g., HD televisions (HDTV), HD radio receivers, etc.) have enabled presentation of higher quality media content (e.g., HD media content), as compared with standard-definition (SD) devices. To meet consumer demands for higher quality content, service providers must allocate enough bandwidth for each media network channel designated to offer HD content to users. However, because HD channels require substantially more bandwidth than SD channels, a service provider that provides HD content must typically sacrifice several SD channels for every HD channel offered. As such, due to limited bandwidth and consumer demand for an abundance of media channels, service providers generally only provide a limited number of channels with HD content.

Therefore, there is a need for an effective approach for assigning definitions to media network channels.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for assigning definitions to media network channels are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
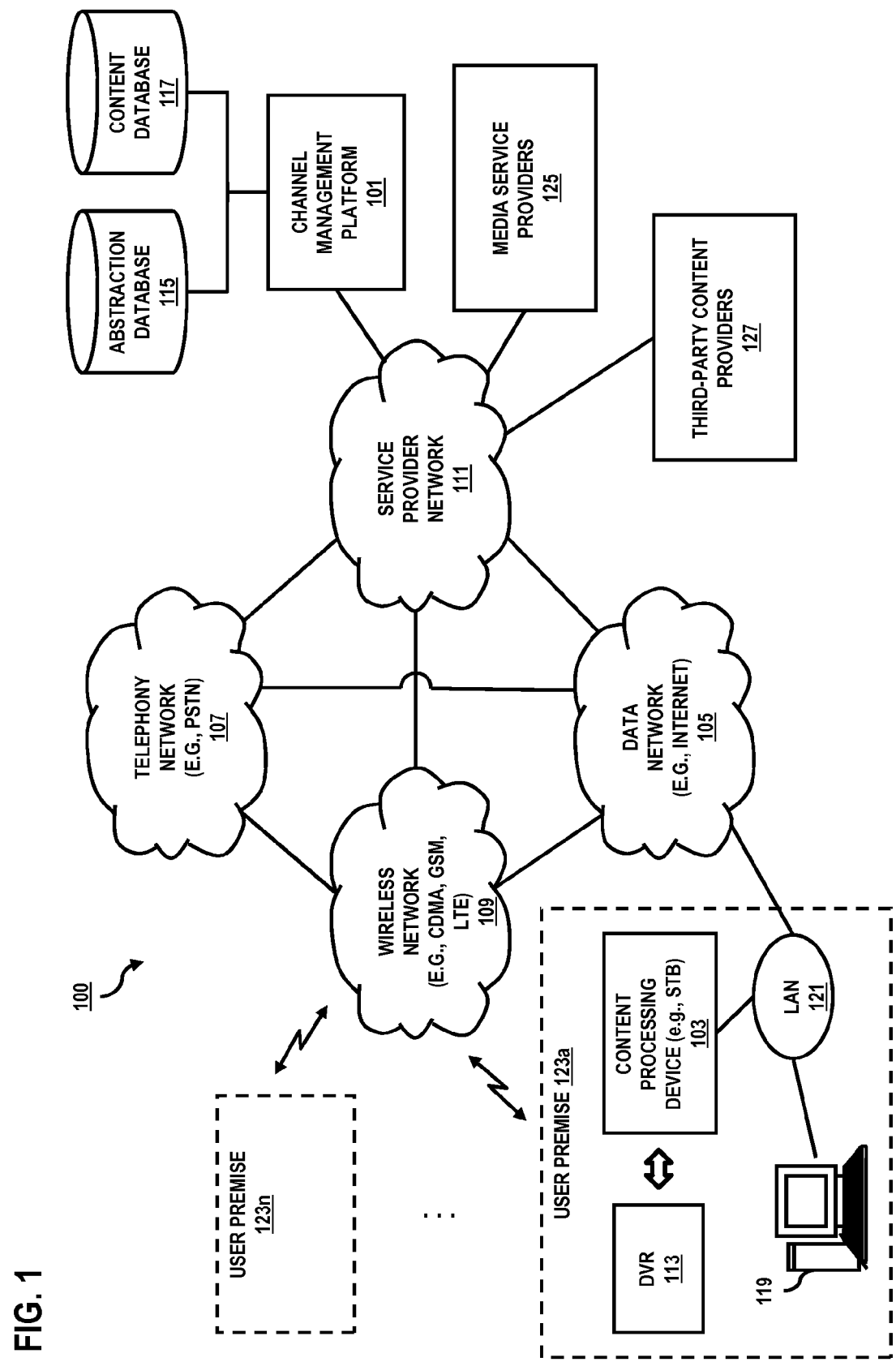
FIG. 1 is a diagram of a system capable of assigning definitions to media network channels, according to an exemplary embodiment.

FIG. 1 is a diagram of a system capable of assigning definitions to media network channels, according to an exemplary embodiment. For the purposes of illustration, system 100 is described with respect to a channel management platform 101 that is configured to interface with content processing devices 103 (e.g., set-top boxes (STBs)) through networks 105-111 (e.g., data network 105, telephony network 107, wireless network 109, and service provider network 111). As used herein, a digital video recorder (DVR) can be either a standalone DVR 113 or an integrated unit of content processing device and DVR. System 100 may be configured to support increased flexibility and efficiency in the way that information is saved or accessed. As such, users are not limited to traditional methods of recording content, configuring content processing device 103, or accessing the content. As shown, the channel management platform 101 may include or have access to an abstraction database 115 to store abstraction data, such as channel mapping data. The channel management platform 101 may, for instance, utilize the abstraction data to create and maintain an abstraction layer between the content and the user's concept of the channel lineup. As such, a video hub office (VHO) can deliver channels in any sequence along with either in-band or out-of-band data providing either full lineup data or deltas from the previous known state. Although some channels may be swapped/floated, the abstraction layer would enable the channels to appear to the user to be in the same sequence. Furthermore, use of the abstraction layer ensures that these changes may occur without requiring the content processing device 103 or DVR 113 to reboot or reinitialize. In addition, the channel management platform 101 may include or have access to a content database 117, which may, for instance, provide and store program content, transition content, associated links to such content, or other information relating to such content. While specific reference will be made hereto, it is contemplated that system 100 may embody many forms and include multiple and/or alternative components and facilities.

In some embodiments, content processing devices 103 and/or computing devices 119 may be configured to communicate over one or more local area networks (LANs) 121 corresponding to user premises 123*a*-123*n*. In this manner, routers (not shown) may be used for establishing and operating, or at least connecting to, a network such as a "home" network or LAN 121, and is used to route communications within user premises 123*a*-123*n*. For example, content processing device 103 may be a set-top box communicatively coupled to LAN 121 via a router and a coaxial cable, whereas computing devices 119 may be connected to LAN 121 via a router and a wireless connection, a network cable (e.g., Ethernet cable), and/or the like. It is noted, however, that in certain embodiments content processing device 103 may be configured to establish connectivity with LAN 121 via one or more wireless connections. Further, content processing device 103 and computing device 119 may be uniquely identified by LAN 121 via any suitable addressing scheme. For example, LAN 121 may utilize the dynamic host configuration protocol (DHCP) to dynamically assign "private" DHCP internet protocol (IP) addresses to content processing device 103 and computing devices 119, i.e., IP addresses that are accessible to devices such as content processing devices 103 and computing devices 119 that are part of LAN 121 facilitated via router, i.e., connected to a router.

Accordingly, it is noted that user premises 123a-123n may be geospatially associated with one or more regions. As such, content processing devices 103 associated with these user premises 123a-123n may be configured to communicate with and receive information from the channel management platform 101. This information may include content or user profile information among many other things. Additionally, content processing devices 103 associated with these user premises 123a-123n may be configured to communicate with and receive signals and/or data streams from media service providers 125 (or other transmission facility, e.g., third-party content providers 127). These signals may include media content retrieved over the networks 105-111, as well as conventional video broadcast content.

As used herein, media content broadly includes any audio-visual content (e.g., broadcast television programs, video-on-demand (VOD) programs, pay-per-view programs, Internet Protocol television (IPTV) feeds, etc.), pre-recorded media content, data communication services content (e.g., commercials, advertisements, videos, movies, songs, images, sounds, etc.), Internet services content (streamed audio, video, or image media), and/or any other equivalent media form. In this manner, media service providers 125 may provide their own media content as well as content obtained from other sources (e.g., content from third-party content provider 127, content available via the networks 105-111, etc.).

As mentioned, the influx of HD devices in recent years has created a substantial demand for HD content. Consequently, service providers offer HD channels to deliver the HD content that their users demand. As explained, although HD channels enable the transmission of higher quality programming (as compared with SD channels), HD channels require substantially more bandwidth than SD channels. As such, because service providers have limited bandwidth, they must sacrifice the ability to offer several SD channels for each HD channel that they provide. Generally, service providers offer a mixture of SD and HD channels to balance consumer demand for access to hundreds of media channels and the demand for high-quality programming. Due to the higher resource requirements of HD channels, the typical mixture involves substantially fewer HD channels than SD channels where the HD channel assignments are dedicated to media network channels with the most frequent demand for HD content (e.g., sporting events channels or premium movie channels). On the other hand, media network channels with fewer viewers and less demand for HD content (e.g., classic movie channels or non-primary language programming channels) are permanently relegated as SD channels. However, when certain media network channels assigned as SD channels have program content with large audiences (e.g., a popular television show on an unpopular media network channel), the service provider may lose ground to other service providers that have designated those media network channels as HD channel. Specifically, users who are unsatisfied with their service provider's failure to provide their preferred shows in HD are more likely to switch to other service providers.

To address this issue, the system 100 of FIG. 1 introduces the capability to effectively provide definition assignments dynamically to media network channels. It is noted that although various embodiments are described with respect to television shows, movies, other video programming, etc., it is contemplated that the approach described herein may also be used for any other program content, such as radio programming, music programming, etc. It is further noted that although various embodiments are described with respect to SD and HD formats, it is contemplated that the approach described herein may also be used for any other formats, resolution, etc. By way of example, the channel management platform 101 may determine a demand for program content of a media network channel associated with a first definition relating to resolution of the program content. The demand may, for instance, be based on user demand, a predetermined schedule, or a combination thereof. In response to the demand, the channel management platform 101 may assign a second definition to the media network channel for the program content (e.g., for at least the duration of the program content). The second definition may, for instance, relate to the resolution of the program content and may be higher in resolution than the first definition. By way of another example, the content processing device 103 may generate a request for the program content of the media network channel. As indicated, although the media network channel may initially be associated with the first definition (e.g., SD), the second definition (e.g., with the higher resolution of HD) may be assigned to the media network channel for the program content in response to the demand determined for the program content. The following scenarios illustrate typical situations in which the channel management platform 101 and/or the content processing device 103 can be more effective in assigning definitions to media network channels.

In one scenario, some of the media network channels of a particular service provider may be designated (and remain) as HD channels, while others media network channels may generally be assigned as SD channels but may occasionally be assigned as HD channels. With this setup, non-fixed HD media network channels may be reassigned as SD channels, for instance, during non-peak viewing periods or when such non-fixed HD media network channels are airing SD programming. The resulting freed bandwidth from the reassignment may then be allocated to another media network channel (e.g., initially assigned as a SD channel) that is about to begin airing a popular HD show or a highly publicized live event. In this way, the service provider can provide more channels (e.g., by offering less fixed HD media network channels) and a greater range of HD content since HD slots (or assignments) may be passed between media network channels with little or no conflicts for higher bandwidth or other resource requirements.

In another scenario, assignments of HD channels may be based on a premium service where users can request that certain program content of particular media network channels be provided in HD format. As part of the premium service, for instance, users may make requests for various television shows, live events, movies, radio programs, etc., of a particular media network channel to be delivered to the users' STBs/DVRs when the program content is aired. Due to a limited amount of bandwidth, however, the premium service may require that at least a certain number of requests by different users for the same program content are made before the particular media network channel is given the HD assignment. That is, if a sufficient number of users in a specified region make requests for the same television show on the same media network channel, the media network channel may be assigned as a HD channel for the duration of the requested television show.

In certain embodiments, the channel management platform 101 may generate transition content for transmission over a control channel to a user device to cache the transition content at the user device. Thus, the user device may receive the transition content over the control channel for caching at the user device. The transition content may, for instance, include a portion of the program content, synchronization data of the program content, or a combination thereof for performing a transition to the program content. In one use case, a single control channel may be utilized to deliver transition content for a large number of media network channels since only a couple of seconds of content may be needed for each media network channel that will require the transition to its program content. Even assuming that a single SD channel (e.g., Quadrature Amplitude Modulation (QAM) sub-channel with sufficient bandwidth for SD content) is designated as the control channel, HD content for each media network channel can be "slow-played" to the user device over the single SD channel (e.g., as a result of the narrower bandwidth channel) for caching at the user device. Such an approach, for instance, can typically result in hundreds of transitions (e.g., transition content for hundreds of media network channels) being cached every hour. In a further scenario, information about planned "dark space" between commercials may be provided (e.g., in the form of synchronization data of the program content) so that a rapid change can be made during that moment between video feeds. In this way, the portion of the program content, the synchronization data (e.g., clock synchronization, information about "dark spaces," etc.) of the program content, and/or other transition data may be used to ensure that transitions occur at the correct time. Moreover, momentary flickers or missed frames between data swaps may be mitigated, or eliminated, using such an approach. Electronic program guides/schedules may also reflect the transitions so that users can see which showings are in HD vs. SD.

In various embodiments, the channel management platform 101 may allocate bandwidth for the media network channel according to the assigned second definition. By way of example, the assigned second definition may be a particular HD format which allows for higher quality audio, better video resolution, etc., but requires substantially more bandwidth than a SD format. Thus, if the media network channel is assigned as a HD channel, the bandwidth necessary to transmit program content in the HD format must be allocated to the media network channel to deliver the HD content.

In other embodiments, the channel management platform 101 may determine another demand for another program content of another media network channel. The channel management platform 101 may then reallocate the bandwidth from the media network channel to the other media network channel in response to the other demand. In one scenario, media network channel X may have been recently assigned as a HD channel due to a high demand for Show X1 which airs on the media network channel X. Following Show X1, however, is an unpopular show, Show X2. Prior to the airing of Show X2, a high demand for Show Y1 of the media network channel Y may have been determined. If, for instance, media network channel Y is currently assigned as a SD channel, media network channel X may be reassigned as a SD channel and media network channel Y may be reassigned as a HD channel since X2 has a small viewership and Show Y1 has a high viewership. As such, the bandwidth that is currently allocated to media network channel X may be reallocated to media network channel Y immediately prior to the airing of Show Y1 to enable delivery of Show Y1 in HD via the media network channel Y.

In a further scenario, Show Y2 which airs immediately after Show Y1 on media network channel Y may be a show with a high viewership. Nonetheless, it may be determined that Show Y2 is only available in SD and, thus, would not require the bandwidth that is necessary for the delivery of HD content. In addition, it may be determined that Show X3 airs on media network channel X at the same time Show Y2 airs on media network channel Y and that Show X3 has a relatively high viewership. As a result, media network channel X may be reassigned as an HD channel, media network channel Y may be reassigned as a SD channel, and the bandwidth currently allocated to media network channel Y may be reallocated to media network channel X immediately prior to the airing of Show X3.

In additional embodiments, the channel management platform 101 may determine a number of requests, a percentage of requests, or a combination thereof by one or more users for the program content. The user demand may, for instance, be based on the number, the percentage, or a combination thereof. In one use case, twenty percentage of a particular region has set to record Show X on media network channel X at a certain time on their DVRs (e.g., DVR 113). Based on the large percentage of recording requests by the users of the particular region, the user demand for Show X may be determined to be great enough to justify switching media network channel X from an SD channel to an HD channel. In another use case, the number of viewers for media network channel X may suddenly increase from about 10,000 viewers to 200,000 viewers several minutes before Show X. As such, the number of requests Show X (e.g., from the viewers' STBs/DVRs) may be considered a sufficient amount of user demand for switching media network channel X from an SD channel to an HD channel.

In some embodiments, the channel management platform 101, the content processing device 103, the DVR 113, the computing device 119, and other elements of the system 100 may be configured to communicate via the service provider network 111. According to certain embodiments, one or more networks, such as the data network 105, the telephony network 107, and/or the wireless network 109, may interact with the service provider network 111. The networks 105-109 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-109 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-109 may include components and facilities to provide for signaling and/or bearer communications between the various components or facilities of the system 100. In this manner, the networks 105-109 may embody or include portions of a signaling system 7 (SS7) network, Internet protocol multimedia subsystem (IMS), or other suitable infrastructure to support control and signaling functions.

Figure 2:
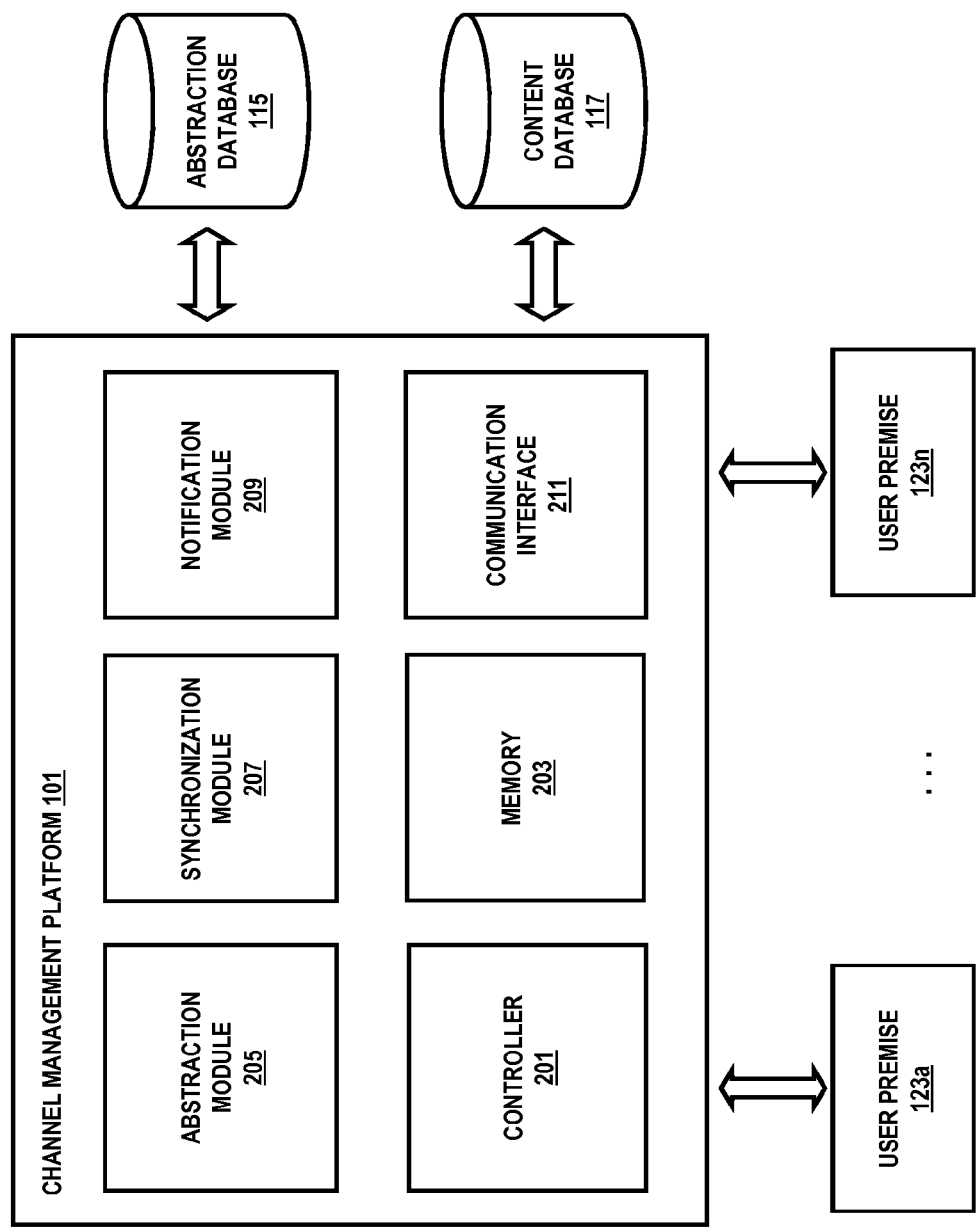
FIG. 2 is a diagram of the components of a channel management platform, according to an exemplary embodiment.

FIG. 2 is a diagram of the components of a channel management platform, according to an exemplary embodiment. The channel management platform 101 may comprise computing hardware (such as described with respect to FIG. 8), as well as include one or more components configured to execute the processes described herein for providing coded access services of the system 100. It is contemplated that the functions of these components may be combined in one or more components or performed by other components of equivalent functionality. In one implementation, the channel management platform 101 includes a controller (or processor) 201, memory 203, an abstraction module 205, a synchronization module 207, a notification module 209, and a communication interface 211.

The controller 201 may execute at least one algorithm for executing functions of the channel management platform 101. For example, the controller 201 may interact with the abstraction module 205 to determine a demand for program content of a media network channel associated with a first definition relating to resolution of the program content. As indicated, the demand may be based on user demand, a predetermined schedule, or a combination thereof. In one scenario, demand may determined on-the-fly as various program content are being rendered on one or more media network channels. As such, the abstraction module 205 may determine the number of requests and/or the percentage of requests by one or more users for the various program content (e.g., the number of viewers for media network channel X suddenly increases from about 10,000 viewers to 200,000 viewers several minutes before Show X). The abstraction module 205 may then calculate the user demand based on the number of requests and/or the percentage of requests. In another scenario, demand may also be determined based on a predetermined schedule (e.g., program content listings shown on electronic program guides). Thus, the abstraction module 205 may utilize the predetermined schedule to determine the date and time that certain popular shows (e.g., popular shows on media network channels that are less frequently watched) are offered. These popular shows may be ranked, for instance, by the number of viewers (e.g., on average) for each of the shows, the percentage of viewers for the particular time slots, etc. The associated media network channels of the respective shows may then be assigned a higher-resolution definition based on the rankings as well as available resources (e.g., bandwidth, memory, etc.).

As indicated, in response to the determined demand, the abstraction module 205 may assign a second definition to the media network channel for the program content (e.g., while the program content is being aired) where the second definition relates to the resolution of the program content and is higher in resolution than the first definition. As such, the abstraction module 205 may also allocate bandwidth for the media network channel according to the assigned second definition. In this way, for instance, media network channels typically assigned SD slots may temporarily be assigned HD slots so that various program content (e.g., high-demand program content, program content with significant requests to provide the program content in HD, etc.) on such media network channels can be offered to consumers in HD.

In addition to demand calculations and definitions assignments based on the calculated demand, the abstraction module 205 may also utilize abstraction data (e.g., from the abstraction database 115) to create and maintain an abstraction layer between the program content and the user's concept of the channel lineup. By way of example, channels may be delivered from the VHO in any sequence. The abstraction layer may, however, reorganize the sequence of the channels as they appear on the users' electronic program guides. Although some channel slots may be swapped/floated, the abstraction layer would enable the channel lineup on the electronic program guides to remain the same for the users.

The controller 201 may also direct the synchronization module 207 to generate transition content for transmission over a control channel to a user device to cache the transition content at the user device. The generated transition content may, for instance, include a portion of the program content, synchronization data of the program content, or a combination thereof for performing a transition to the program content. As discussed, even if only a single SD channel is designated as the control channel, transition content for hundreds of media network channels may be cached at the user device every hour. If, for instance, transition content for HD programming needs to be delivered, "slow-playing" the transition content over the single SD channel can still result in the high number of transition content caches since only a few seconds of content is needed for each transition.

When demand for the particular program content of the media network channel has ceased, or perhaps if the abstraction module 205 determines that another demand for another program content of another media network channel is higher than the current demand for the particular program content, the abstraction module 205 may remove the assignment of the second definition from the media network channel and assign the second definition to the other media network channel for the other program content. Thus, the abstraction module 205 may also reallocate the bandwidth from the media network channel to the other media network channel in response to the other demand.

The controller 201 may additionally work with the notification module 209 to generate notification messages to alert users, for instance, of modifications to the various program content, media network channels, etc. In one use case, the notification messages may inform users of on-the-fly definition assignments and bandwidth allocations for program content that the users are currently watching and/or recording. A sudden switch, for instance, from SD content to HD content may include a notification message to inform the user that the service provider is currently delivering the program content in a higher quality format for the user's viewing pleasure. In this way, ambiguities with respect to the causes of the switch may be avoided (e.g., belief that the delivery of the prior lower quality format was an error on the part of the service provider may be avoided).

The controller 201 may further utilize the communication interface 211 to communicate with other components of the channel management platform 101, the content processing device 103, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. By way of example, such methods may be used to initiate transmission of the program content, transition content, notification messages, etc., to the user devices (e.g., the content processing devices 103).

Figure 3:
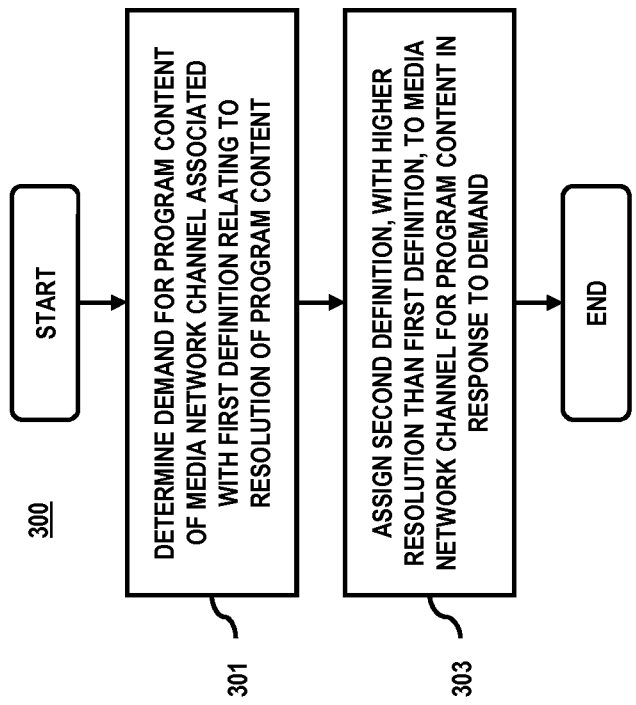
FIG. 3 is a flowchart of a process for assigning definitions to media network channels, according to an exemplary embodiment.

FIG. 3 is a flowchart of a process for assigning definitions to media network channels, according to an exemplary embodiment. For the purpose of illustration, process 300 is described with respect to FIG. 1. It is noted that the steps of the process 300 may be performed in any suitable order, as well as combined or separated in any suitable manner. In step 301, the channel management platform 101 may determine a demand for program content of a media network channel associated with a first definition relating to resolution of the program content. As mentioned, the demand may be based on user demand, a predetermined schedule, or a combination thereof. The user demand may, for instance, be determined based upon the number of requests, the percentage of requests, etc., by one or more users for the program content, and the predetermined schedule may include program content listings, scheduled events, etc.

In step 303, the channel management platform 101 may assign a second definition to the media network channel for the program content in response to the demand, wherein the second definition relates to the resolution of the program content and is higher in resolution than the first definition. As such, media network channels initially assigned a low-resolution definition (e.g., SD assignment) may still offer high-resolution content (e.g., HD content) through dynamic reassignments based on demand. In this way, a service provider can provide more channels (e.g., by offering less fixed high-resolution media network channels) and a greater range of high-resolution content since high-resolution definitions can be reassigned between media network channels with little or no conflicts for higher bandwidth or other resource requirements.

Figure 4:
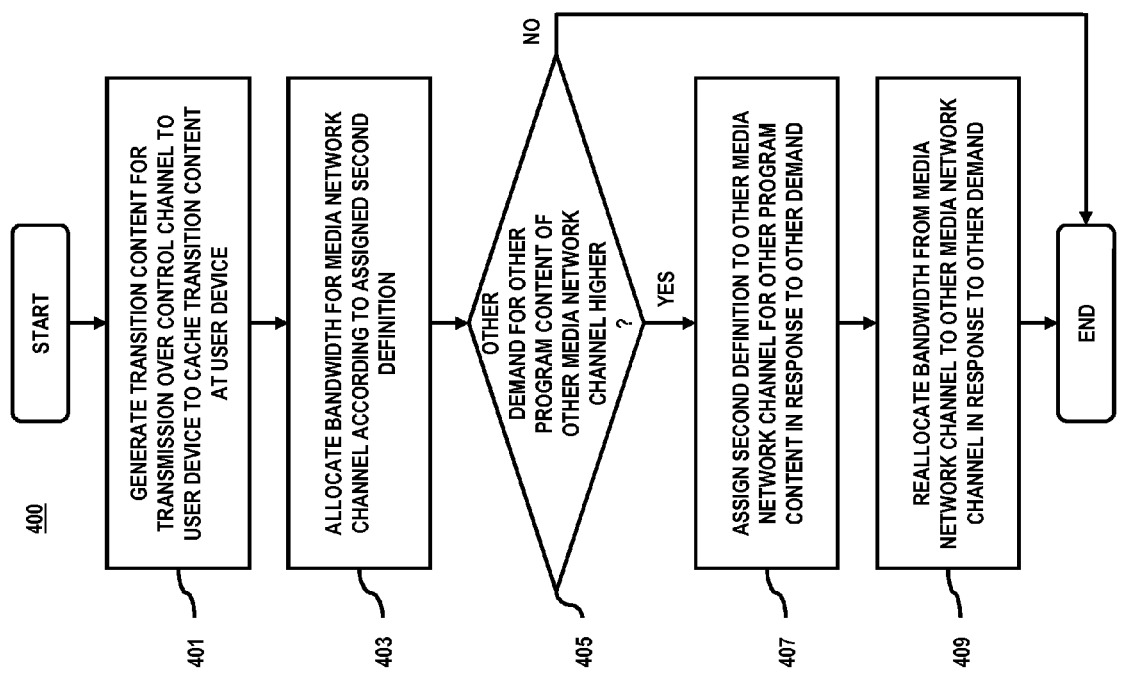
FIG. 4 is a flowchart of a process for handling definition assignments and reassignments, according to an exemplary embodiment.

FIG. 4 is a flowchart of a process for handling definition assignments and reassignments, according to an exemplary embodiment. For the purpose of illustration, process 400 is described with respect to FIG. 1. It is noted that the steps of the process 400 may be performed in any suitable order, as well as combined or separated in any suitable manner. In step 401, the channel management platform 101 may generate transition content for transmission over a control channel to a user device to cache the transition content at the user device, wherein the transition content includes a portion of the program content, synchronization data of the program content, or a combination thereof for performing a transition to the program content. By way of example, transition content for each media network channel may include a small portion of the program content, clock synchronization data, information about planned "dark space" between commercials of the program content, metadata about delivery layer channel changes, mappings to user-layer channels (e.g., channels as seen by the users on electronic program guides), etc. Such transition content may, for instance, be used to ensure that transitions occur at the correct time, and to mitigate (or eliminate) momentary flickers or missed frames between data swaps.

In step 403, the channel management platform 101 may also allocate bandwidth for the media network channel according to the assigned second definition. In the context of SD/HD content, for instance, if the media network channel is assigned as a HD channel, the bandwidth necessary to transmit program content in the HD format must be allocated to the media network channel to deliver the HD content.

In step 405, the channel management platform 101 may determine whether there are other demands for other program content of other media network channels that are greater than the current demand for the program content of the media network channel. If, for instance, it is determined that other demands are greater than the current demand for the program content and available network bandwidth is already reserved for other purposes (e.g., permanently assigned to popular media network channels, temporary allocated to high-demand program content, etc.), the channel management platform 101 may, as in step 407, assign the second definition to one of the other media network channels (e.g., associated with one of the respective other program content with the greatest demand). Thus, as in step 409, the channel management platform 101 may reallocate the bandwidth from the media network channel to the other media network channel in response to the other demand. If, however, the other demands are determined not to be greater than the current demand, no reassignment or reallocation (e.g., definition, bandwidth, etc.) may be performed.

Figure 5:
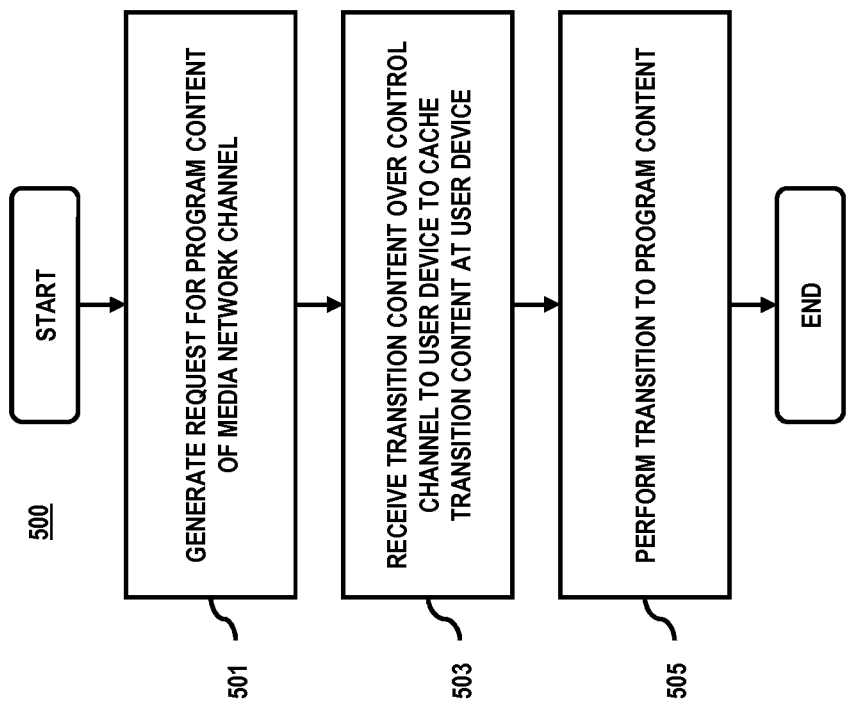
FIG. 5 is a flowchart of a process for handling definition assignments at a user device, according to an exemplary embodiment.

FIG. 5 is a flowchart of a process for handling definition assignments at a user device, according to an exemplary embodiment. For the purpose of illustration, process 500 is described with respect to FIG. 1. It is noted that the steps of the process 500 may be performed in any suitable order, as well as combined or separated in any suitable manner. In step 501, the content processing device 103 may generate a request for program content of a media network channel. As mentioned, the media network channel may initially be assigned a first definition relating to resolution of the program content, but may be assigned a second definition (e.g., that relates to the resolution of the program content and is higher in resolution than the first definition) in response to a demand for the program content. In one use case, calculation of the demand may include the generated request for the program content (e.g., determining the user demand).

In step 503, the content processing device 103 may receive transition content over a control channel to a user device (e.g., which includes the content processing device 103) to cache the transition content at the user device. As mentioned, the received transition content may include a portion of the program content, synchronization data of the program content, or a combination thereof for performing a transition to the program content. By way of example, received transition content may include a small portion of the program content, clock synchronization data, information about planned "dark space" between commercials of the program content, metadata about delivery layer channel changes, mappings to user-layer channels (e.g., channels as seen by the users on electronic program guides), etc. As a result, the content processing device 103 may, as in step 505, perform the transition to the program content using the received transition content.

Figure 6:
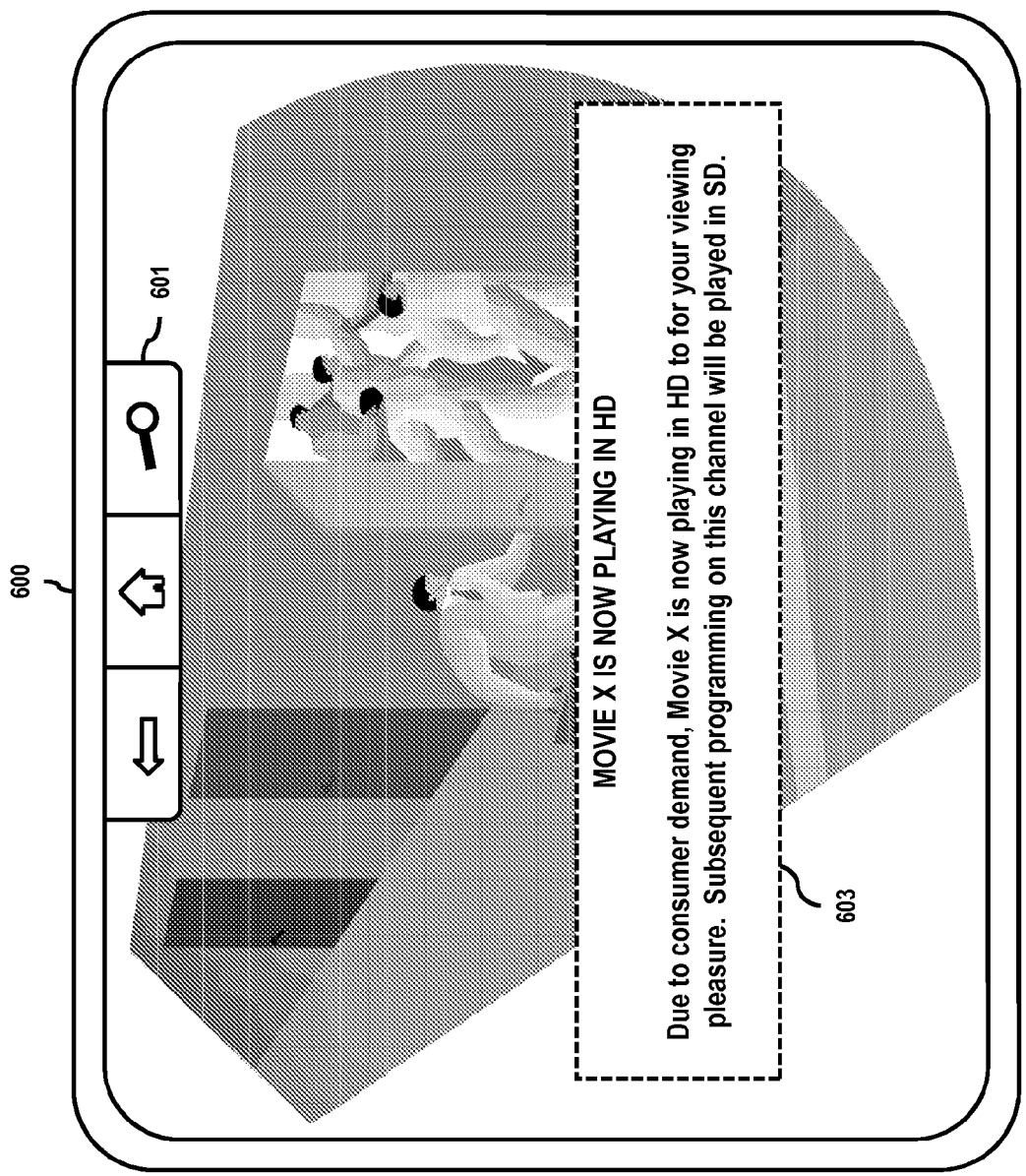
FIG. 6 is a diagram of a user interface for illustrating assigning definitions to media network channels, according to an exemplary embodiment.

FIG. 6 is a diagram of a user interface for illustrating assigning definitions to media network channels, according to an exemplary embodiment. For illustrative purposes, the diagram is described with reference to the system 100 of FIG. 1. As shown, the diagram features the user interface 600 with options 601 and a notification message 603. In this scenario, the channel management platform 101 detected a substantial amount of user demand for Movie X a few minutes before Movie X started to air, and determined that the user demand satisfied a predetermined demand threshold for an assignment of a HD channel (e.g., the requests generated by consumer STBs/DVRs for the movie met a predetermined number/percentage threshold for HD assignments). As such, before Movie X began, the channel management platform 101 determined that an HD version of the movie is available on a network database (e.g., content database 117), retrieved the HD version from the network database, generated transition content that includes a beginning portion of the HD version and synchronization data for the movie, and transmitted the transition content over a control channel to users' STBs/DVRs, which then cached the transition content. In addition, the media network channel (e.g., previously assigned as a SD channel) airing Movie X is assigned as a HD channel in response to the detected user demand, and then allocated bandwidth necessary for the delivery of HD content.

When it is time for Movie X to air, the STBs/DVRs begin by providing the cached beginning portion of the HD version to the users. At the same time, the user is provided with the notification message 603 to inform them that Movie X is now playing in HD for their viewing pleasure and that subsequent programming on the particular channel will be played in SD. When the assignment and the allocation of bandwidth is complete, the rest of the movie is transmitted to the STBs/DVRs via the newly assigned HD channel. As such, the STBs/DVRs may then utilize the synchronization data for the movie to seamlessly switch from the cached portion to the content being transmitted over the newly assigned HD channel.

Figures 7A, 7B, 7C:
FIGS. 7A-7C are diagrams of assignments for media network channels, according to various exemplary embodiments.

FIGS. 7A-7C are diagrams of assignments for media network channels, according to various exemplary embodiments. For illustrative purposes, the diagrams are described with reference to the system 100 of FIG. 1. FIG. 7A illustrates the diagram 700 of QAM channels along with respective sub-channels to which the media network channels are assigned. As shown, media network channel X1-X4 are assigned as sub-channels of the QAM channel 65 starting from the frequency 471 MHz, and media network channels X5 and X6 are assigned as sub-channels of the QAM channel 66 starting from the frequency 477 MHz. In this scenario, each of the sub-channels of the QAM channel 66 are provided enough bandwidth to deliver HD programming, while each of the sub-channels of the QAM channel 65 are only provided sufficient bandwidth to deliver SD programming. As indicated, these assignments may not be fixed and, thus, the channel management platform 101 may reassign the various sub-channels to enable, for instance, popular program content on media network channels typically assigned an SD sub-channel to be delivered in HD format. In addition, as depicted, one of the sub-channels of the QAM channel 65 is designated as a control channel for enabling transitions of program content.

FIG. 7B illustrates the diagram 730 of an assignment table that reflects the diagram 700 in FIG. 7A. As shown, the user channels 1-6 respectively correspond to media network channels X1-X6. The user channels may, for instance, represent the channel line-up as it appears on electronic program guides to users. Moreover, media network channels X1-X4 respectively correspond to QAM sub-channels 65-1SD to 65-4SD, while media network channels X5 and X6 respectively correspond to QAM sub-channels 66-1HD and 66-2HD. The current assignments may, for instance, reflect the current and anticipated demands for the various media network channels. By way of example, the channel management platform 101 may have determined that there are high demands for the current program content of media network channels X5 and X6. Thus, the media network channels X5 and X5 may have been assigned QAM sub-channels 66-1HD and 66-2HD as a result of the determined demands (e.g., just prior to the beginning of the respective television shows on the media network channels X5 and X6).

FIG. 7C illustrates the diagram 750 of the assignment table which reflects modifications to the assignments (and/or allocation of bandwidth). In this scenario, the current demands for program content of media network channels X5 and X6 are low (e.g., low demand for the television shows currently airing on media network channels X5 and X6), while the current demand for program content of media network channels X1 and X2 are high. Thus, QAM sub-channel 66-1HD and 66-2HD has been respectively reassigned from media network channels X5 and X6 to media network channels X2 and X1. As indicated, the reassignment process may include the generation and transmission of transition content for the program content of each of the media network channels (e.g., X1, X2, X5, and X6) for caching at the STBs/DVRs (e.g., of the user premises 123a-123n). As such, the cached transition content may be used to transition to the respective program content of the media network channels, for instance, while bandwidth is appropriately reallocated for the media network channels. As discussed, despite reassignment of the QAM sub-channels to different media network channels, the channel line-up (e.g., the user channels) for the users remains the same to avoid any user confusion or frustration.

In certain embodiments, the described processes and arrangements advantageously enable service providers to more flexibly accommodate users' demands for higher resolution programming without securing more total bandwidth. Consequently, the user experience is enhanced.

The processes described herein for assigning definitions to media network channels may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
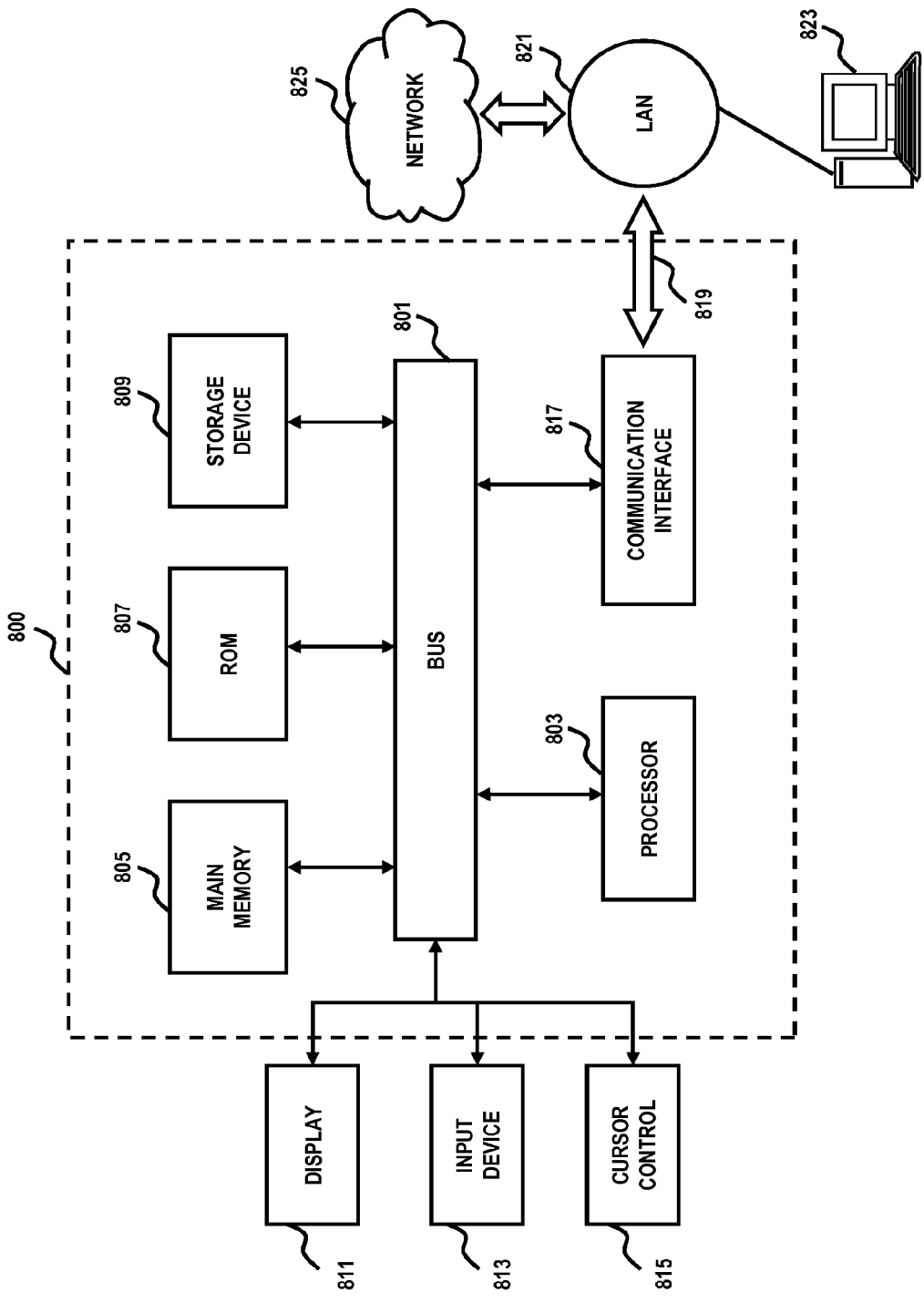
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk, flash storage, or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. Additional output mechanisms may include haptics, audio, video, etc. An input device 813, such as a keyboard including alphanumeric and other keys, is coupled to the bus 801 for communicating information and command selections to the processor 803. Another type of user input device is a cursor control 815, such as a mouse, a trackball, touch screen, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
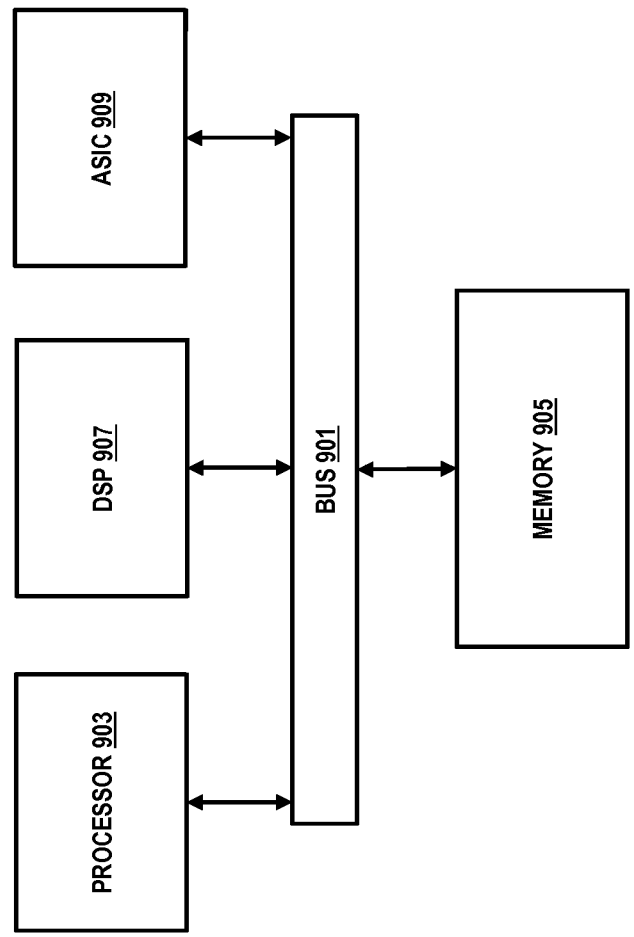
FIG. 9 is a diagram of a chip set that can be used to implement an embodiment of the invention.

FIG. 9 illustrates a chip set or chip 900 upon which an embodiment of the invention may be implemented. Chip set 900 is programmed to enable definition assignments to media network channels as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling definition assignments to media network channels.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to perform specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable definition assignments to media network channels. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

Articles such as "a", "an" and "the" may refer to one or more of the referenced items.

What is claimed is:

1. A method comprising:
    determining via a processor a predetermined schedule, for program content of a media network channel associated with a Standard-definition (SD) resolution of the program content; and
    assigning via the processor only a High-definition (HD) to the media network channel for the program content in response to a number of users in a specified region making a request for a same program content on a same media network channel exceeding a predetermined threshold,
    wherein the HD relates to the resolution of the program content and is higher in resolution than the SD resolution, the method further comprising:
    generating transition content for transmission over a control channel to a user device to cache the transition content at the user device,
    wherein the transition content comprises a portion of the program content in HD resolution and clock synchronization data,
    wherein the control channel is a single media network channel with SD resolution bandwidth that is utilized to deliver the transition content for at least one hundred media network channels,
    wherein a remaining duration of the requested program content in HD resolution is to be slow-played to the user device over the single media network channel with SD resolution bandwidth for caching at the user device, and
    wherein an electronic program guide (EPG) reflects the transition.

2. A method according to claim 1 wherein the transition content further includes synchronization data of the program content.

3. A method according to claim 1, further comprising:
    allocating bandwidth for the media network channel according to the assigned HD.

4. A method according to claim 3, further comprising:
    determining another demand for another program content of another media network channel; and
    reallocating the bandwidth from the media network channel to the other media network channel in response to the other demand.

5. A method according to claim 1, further comprising:
    determining a number of requests, a percentage of requests, or a combination thereof by one or more users for the program content,
    wherein a user demand is based on the number, the percentage, or a combination thereof.

6. An apparatus comprising:
    at least one processor; and
    at least one memory including computer program code for one or more programs,
    the at least one memory and the computer program code configured to, with the at least one processor, cause the apparatus to perform at least the following,
    determine a predetermined schedule for program content of a media network channel associated with a Standard-definition (SD) resolution of the program content; and
    assign only a High-definition (HD) to the media network channel for the program content in response to a user demand for the predetermined schedule exceeding a predetermined threshold,
    assign only a High-definition (HD) to the media network channel for the program content in response to a number of users in a specified region making a request for a same program content on a same media network channel exceeding a predetermined threshold,
    wherein the HD relates to the resolution of the program content and is higher in resolution than the SD resolution, wherein the apparatus is further caused to:
    generate transition content for transmission over a control channel to a user device to cache the transition content at the user device,
    wherein the transition content comprises a portion of the program content in HD resolution and clock synchronization data,
    wherein the control channel is a single media network channel with SD resolution bandwidth that is utilized to deliver the transition content for at least one hundred media network channels,
    wherein a remaining duration of the requested program content in HD resolution is to be slow-played to the user device over the single media network channel with SD resolution bandwidth for caching at the user device, and
    wherein an electronic program guide (EPG) reflects the transition.

7. An apparatus according to claim 6, wherein the transition content further includes synchronization data of the program content.

8. An apparatus according to claim 6, wherein the apparatus is further caused to:
    allocate bandwidth for the media network channel according to the assigned HD.

9. An apparatus according to claim 8, wherein the apparatus is further caused to:

determine another demand for another program content of another media network channel; and reallocate the bandwidth from the media network channel to the other media network channel in response to the other demand.

10. An apparatus according to claim 8, wherein the apparatus is further caused to:
determine a number of requests, a percentage of requests, or a combination thereof by one or more users for the program content,
wherein a user demand is based on the number, the percentage, or a combination thereof.

11. A method comprising:
generating via a processor a request for program content of a media network channel,
wherein the media network channel is initially associated with a Standard-definition (SD) resolution of the program content,
wherein only a High-definition (HD) is assigned to the media network channel for the program content in response to a number of users in a specified region making a request for a same program content on a same media network channel exceeding a predetermined threshold, and
wherein the HD relates to the resolution of the program content and is higher in resolution than the SD resolution, the method further comprising:
receiving transition content over a control channel to a user device to cache the transition content at the user device,
wherein the transition content comprises a portion of the program content in HD resolution and clock synchronization data,
wherein the control channel is a single media network channel with SD resolution bandwidth that is utilized to deliver the transition content for at least one hundred media network channels,
wherein a remaining duration of the requested program content in HD resolution is to be slow-played to the user device over the single media network channel with SD resolution bandwidth for caching at the user device, and
wherein an electronic program guide (EPG) reflects the transition.

12. A method according to claim 11, wherein the transition content further includes synchronization data of the program content.

13. A method according to claim 11, wherein bandwidth is allocated for the media network channel according to the assigned HD, and wherein the bandwidth is reallocated from the media network channel to another media network channel in response to another demand for another program content of the other media network channel.

14. A method according to claim 11, wherein a user demand is based on a number of requests, a percentage of requests, or a combination thereof by one or more users for the program content.

15. An apparatus comprising:
at least one processor; and
at least one memory including computer program code for one or more programs,
the at least one memory and the computer program code configured to, with the at least one processor, cause the apparatus to perform at least the following,
generating a request for program content of a media network channel,
wherein the media network channel is initially associated with a Standard-definition (SD) resolution of the program content,
wherein only a High-definition (HD) is assigned to the media network channel for the program content in response to a number of users in a specified region making a request for a same program content on a same media network channel exceeding a predetermined threshold, and
wherein the HD relates to the resolution of the program content and is higher in resolution than the SD resolution, wherein the apparatus is further caused to:
receive transition content over a control channel to a user device to cache the transition content at the user device,
wherein the transition content comprises a portion of the program content in HD resolution and clock synchronization data,
wherein the control channel is a single media network channel with SD resolution bandwidth that is utilized to deliver the transition content for at least one hundred media network channels,
wherein a remaining duration of the requested program content in HD resolution is to be slow-played to the user device over the single media network channel with SD resolution bandwidth for caching at the user device, and
wherein an electronic program guide (EPG) reflects the transition.

16. An apparatus according to claim 15, wherein the transition content further includes synchronization data of the program content.

17. An apparatus according to claim 15, wherein bandwidth is allocated for the media network channel according to the assigned HD, and wherein the bandwidth is reallocated from the media network channel to another media network channel in response to another demand for another program content of the other media network channel.

18. An apparatus according to claim 15, wherein a user demand is based on a number of requests, a percentage of requests, or a combination thereof by one or more users for the program content.

* * * * *